US012798433B2

(12) United States Patent
Jiang et al.

(10) Patent No.: US 12,798,433 B2
(45) Date of Patent: Nov. 17, 2026

(54) MOBILE POWER STORAGE AND CHARGING DEVICE FOR NEW ENERGY VEHICLE

(71) Applicant: Shenzhen HB electronic co., ltd, Shenzhen (CN)

(72) Inventors: Dongyi Jiang, Shenzhen (CN); Hongqiao Qin, Shenzhen (CN)

(73) Assignee: SHENZHEN HB ELECTRONICS CO., LTD., Shenzhen (CN)

( * ) Notice: Subject to any disclaimer, the term of this patent is extended or adjusted under 35 U.S.C. 154(b) by 721 days.

(21) Appl. No.: 18/220,836

(22) Filed: Jul. 12, 2023

(65) Prior Publication Data

US 2024/0391347 A1 Nov. 28, 2024

(30) Foreign Application Priority Data

May 25, 2023 (CN) ......................... 202310608967.7

(51) Int. Cl.

| | |
|---|---|
| ***H02J 7/00*** | (2026.01) |
| ***B60L 53/30*** | (2019.01) |
| ***B60L 53/50*** | (2019.01) |
| ***B60L 53/62*** | (2019.01) |
| ***B60L 53/80*** | (2019.01) |

(52) U.S. Cl.

CPC ............. *B60L 53/80* (2019.02); *B60L 53/305* (2019.02); *B60L 53/50* (2019.02); *B60L 53/62* (2019.02); *B60L 2210/10* (2013.01); *B60L 2210/40* (2013.01)

(58) Field of Classification Search

None

See application file for complete search history.

(56) References Cited

U.S. PATENT DOCUMENTS

| | | | | |
|---|---|---|---|---|
| 5,803,215 A * | 9/1998 | Henze | H02J 7/50 320/109 |
| 2014/0015469 A1* | 1/2014 | Beaston | H02J 3/32 320/101 |
| 2022/0266717 A1* | 8/2022 | Kadam | B60L 53/20 |

* cited by examiner

*Primary Examiner* — Arun C Williams

(74) *Attorney, Agent, or Firm* — Hemisphere Law, PLLC

(57) ABSTRACT

A mobile power storage and charging device for a new energy vehicle includes a housing, a battery pack received in the housing, and a control circuit electrically connected to the battery pack and configured to obtain status data of the battery pack for performing control adjustments thereof. The control circuit includes a BMS battery protection board, a control panel, a DC-DC conversion module, a DC-AC conversion module, an AC charging control board and a DC charging control board respectively connected to the battery pack; the BMS battery protection board configured to detect a status of the battery pack and perform control adjustments; the DC-DC conversion module configured to convert voltages output from the battery pack into a plurality of voltage values and output to a DC port; the DC-AC conversion module configured to convert a DC output from the battery pack into an AC and output to an AC port.

8 Claims, 5 Drawing Sheets

MOBILE POWER STORAGE AND CHARGING DEVICE FOR NEW ENERGY VEHICLE

1. CROSS-REFERENCE TO RELATED APPLICATION

This application claims priority to Chinese Patent Application No. 202310608967.7, entitled "MOBILE POWER STORAGE AND CHARGING DEVICE FOR NEW ENERGY VEHICLE" and filed on May 25, 2023, the content of which is hereby incorporated by reference in its entirety.

BACKGROUND

2. Technical Field

The present disclosure generally relates to the field of charging application technologies for new energy vehicles, and especially relates to a mobile power storage and charging device for a new energy vehicle.

3. Description of Related Art

A new energy vehicle is a vehicle that adopts unconventional automotive fuels taken as a source of power. At present, most new energy vehicles on the market are pure electric vehicles, which mainly use batteries as the power source for supplying power to the vehicles. With a technological progress and development of the new energy vehicles, most new energy vehicles need to charge the batteries by adopting an external charging mode, which mainly includes two types: an AC (alternating current) charging mode and a DC (direct current) charging mode. The new energy vehicle is usually parked in an area with charging stations for charging the battery, and the charging stations are fixed in parking lots or parking spaces, rather than being moved. When the new energy vehicle is driven to an area where the charging stations are not widely used, it is difficult to charge the new energy vehicle and there is a problem of inconvenient charging the new energy vehicle.

Therefore, it is particularly important to provide a mobile power storage and charging device for a new energy vehicle which is a simple structure, easy portability and mobility, in response to the problems existing in conventional technologies.

SUMMARY

The technical problems to be solved: in view of the shortcomings of the related art, the present disclosure provides a mobile power storage and charging device for a new energy vehicle which can be mobility and easy portability to be used, and provide control circuits to integrate a plurality of units in a BMS battery protection board, to implement a plurality of functions, such as voltage detection, automatic equalization, temperature detection, and charge-discharge over-current detection for protecting batteries of the new energy vehicle.

In order to implement the above technical purpose, a technical solution provided by the present disclosure is:

a mobile power storage and charging device for a new energy vehicle according to an embodiment of the present disclosure includes a housing, a battery pack received in the housing, and a control circuit electrically connected to the battery pack and configured to obtain status data of the battery pack for performing control adjustments on a battery of the battery pack. The control circuit includes a BMS battery protection board, a control panel, a DC-DC conversion module, a DC-AC conversion module, an AC charging control board and a DC charging control board; the BMS battery protection board, the DC-DC conversion module and the DC-AC conversion module respectively connected to the battery pack; the BMS battery protection board configured to detect a status of the battery pack and perform control adjustments thereof; the DC-DC conversion module configured to convert voltages output from the battery pack into a plurality of voltage values and then output to a DC (direct current) port; the DC-AC conversion module configured to convert direct current output from the battery pack into alternating current and then output to an AC (alternating current) port. The DC charging control board is connected to the DC-DC conversion module, and the AC charging control board is connected to the DC-AC conversion module.

Wherein the housing includes a display screen, a card reader, an AC charging member and a DC charging member; the card reader configured to read card information and transmit the card information to the control circuit, both the AC charging member and the DC charging member connected to the new energy vehicle for applying power to the new energy vehicle.

Specifically, the above mobile power storage and charging device is configured to electrically connect to the new energy vehicle through the AC charging member or the DC charging member so as to supply power to the new energy vehicle. The control circuit of the above mobile power storage and charging device is configured to control each of the above modules. The BMS battery protection board and a plurality of units integrated in the BMS battery protection board are provided, so as to implement a plurality of functions, such as detecting a voltage of a single battery of the battery pack, performing automatic equalization on the battery, detecting a temperature of the battery, detecting a charging current and a discharging current of the battery, and controlling shutdown of charging and discharging of the battery, thereby ensuring safe charging and discharging of the battery and improving a safety performance of the mobile power storage and charging device. In addition, the DC-DC conversion module can be configured to convert DC voltages of the battery to different voltage values and then output the different voltage values through a plurality of ports, so that the voltages that have been output can be selectively output. The DC-AC conversion module can be configured to convert the DC voltage of the battery into an AC voltage to output the AC voltage, thereby enabling the battery to have a function of charging the AC current and enhancing practicality of the mobile power storage and charging device.

Preferably, the DC-DC conversion module includes a DC chip configured to obtain voltages from the battery pack and then convert the voltages into other voltage values.

Preferably, output ports of the DC-DC conversion module include a USB interface and a Type-C interface.

Wherein the AC charging member is controlled by the AC charging control board, and the DC charging member is controlled by the DC charging control board.

Wherein the BMS battery protection board includes a main control chip, a voltage detection unit, an automatic equalization unit, a temperature detection unit and a charge-discharge current detection unit; the main control chip connected to all the voltage detection unit, the automatic equalization unit, the temperature detection unit and the charge-discharge current detection unit; and wherein the voltage detection unit is configured to detect a voltage value of each single battery within the battery pack and adjust an abnormal state of the single battery during charging and discharging the single battery; the automatic equalization unit configured to obtain the voltage value of each single battery and balance the voltage; the temperature detection unit configured to obtain temperature data of the single battery and determine whether temperature protection is triggered based on the temperature data; the charge-discharge current detection unit configured to obtain a voltage drop of a current detection resistor in circuits during charging and discharging the single battery, to determine whether to perform over-current protection on the single battery.

Wherein the main control chip includes an MCU chip and a chip with a model of SH36705.

Specifically, the main control chip is the chip of SH367305, which is mainly configured to collect information of a voltage, a current and a temperature and then convert the information into digital signals. While, the MCU chip that can read the above information through a TWI communication. The chip of SH367305 does not burn to an upper computer because there is no EEPROM to be configured. Hardware protections of the main control chip of SH367305 only include a hardware over-charging protection and a short circuit protection, and relevant thresholds are configured by the MCU chip. Other overvoltage and undervoltage protection, charging and discharging over-current protection, and temperature protection rely on the MCU chip to collect sampling data, so as to turn off the charging MOS tube and the discharging MOS tube through sending instructions by software.

Wherein the voltage detection unit includes a plurality of detection ports connected to the single battery of the battery pack; and wherein when the battery pack is in an over-charged state, the main control chip controls a charging MOS tube to be turned off through a CHG (charging) port; and when the battery pack is in a discharge over-discharged state, the main control chip controls a discharging MOS tube to be turned off through a DSG (discharging) port.

Preferably, when the battery pack is in the over-charged state, the main control chip outputs a low level through the CHG port to control the charging tube to be turned off; and when the battery pack is in the over-discharged state, the main control chip outputs a low level through the DSG port to control the discharge tube to be turned off.

Wherein the automatic equalization unit includes a sampling port, and is configured to obtain the voltage value of each single battery through the sampling port; and wherein when a voltage of any single battery is greater than an equalization detection voltage, and voltages of the rest of single batteries are less than the equalization detection voltage, and a delay time for performing equalization startup is exceeded, the main control chip opens an equalization channel.

Preferably, the automatic equalization of the battery adopts parity channel time-sharing equalization (such equalization function does not affect a normal voltage sampling of the battery); when a plurality of equalization channels are opened simultaneously, odd channels first enter an equalization state, and even channels enter the equalization state in a next cycle; at this time, the voltage sampling of the battery and the equalization of the battery do not affect with each other.

Wherein the temperature detection unit is configured to obtain the voltage value through a TS port (TS1 and TS2 ports) of the main control chip; and when the voltage value reaches a pre-set internal comparison threshold and maintains a pre-set delay time, the temperature protection is triggered.

Preferably, when the battery is under a condition of charging temperature protection, the main control chip controls the charging MOS tube to be turned off and the discharging MOS tube to be turned on; and when the battery is in a discharge protection state, the main control chip controls both the charging MOS tube and the discharging MOS tube to be turned off.

Specifically, a resistance value of an NTC resistor (i.e. a thermistor) varies along with temperatures. When the voltage detected by the TS port reaches the internal comparison threshold and a corresponding protection delay time is maintained, the temperature protection will be triggered. That is, when the charging temperature protection is performed, the charging MOS tube is turned off (CHG=0 V), and the discharging MOS tube is turned on (DSG=11 V); and when the discharging temperature protection is performed, the charging MOS tube is turned off (CHG=0 V), and the discharging MOS tube is turned off (DSG=0 V).

Wherein the charge-discharge current detection unit includes a charging over-current detection and a discharging over-current detection; and wherein when the voltage of the current detection resistor is less than a charging over-current detection threshold, a charging over-current detection delay time is maintained, and both the CHG port and the DSG port of the main control chip output a low level to control the charging MOS tube and the discharging MOS tube to be turned off, so that the charge-discharge current detection unit enters a charging over-current protection state; and when the voltage of the current detection resistor detected by a RS port of the main control chip is greater than a pre-set over-current protection threshold and remains above the over-current protection delay time, the DSG port of the main control chip outputs the low level to control the MOS tube to be turned off, and the charge-discharge current detection unit enters a discharge over-current protection state.

Specifically, the charge-discharge current detection unit is built-in the charging over-current detection and the discharging over-current detection. The discharging over-current detection is a three-level over-current detection, including a first level over-current protection, a second level over-current protection, and a short-circuit protection. A protection mechanism of the charging over-current detection is: when a voltage of a current detection resistor of a main circuit is less than a charging over-current detection threshold (such as 20 mV), and the charging over-current detection delay time (0.5 S) is maintained, and both the CHG port and the DSG port output the low level to turn off the charging MOS tube and the discharging MOS tube (CHG=0V, DSG=0V), thereby entering the charging over-current protection state. A protection mechanism of the discharging over-current is to detect a voltage drop of the current detection resistor of the main circuit through the RS port to determine whether to enter a corresponding protection. Taking the first level over-current protection as an example, the discharge current changes along with an external load. Both the RS1 port and the RS2 port detect that the voltage of the current detection resistor is greater than a threshold set by the first level over-current protection (the threshold of the first level over-current protection is 50 mV, a threshold of the second level over-current protection is 100 mV, and a threshold of the short circuit protection threshold is 200 mV), and a time is maintained more than the delay time (1 s) of the first level over-current protection; and the DSG port outputs a low level to turn off the discharging MOS tube, so that the chip enters the over-current protection state.

The present disclosure provides the advantages as below:

the present disclosure provides the mobile power storage and charging device for the new energy vehicle which can be mobility and easy portability to be used, and provide control circuits to integrate a plurality of units in the BMS battery protection board, to implement a plurality of functions such as voltage detection, automatic equalization, temperature detection, and charge-discharge over-current detection, for protecting the battery. Furthermore, the present disclosure has advantages of a simple structure, easy portability, rich functions, and strong practicality.

The element labels according to the embodiment of the present disclosure shown as below:

1 housing, 2 battery pack, 3 control circuit, 101 display screen, 102 card reader, 103 AC charging member, 104 DC charging member, 301 BMS battery protection board, 302 control panel, 303 DC-DC conversion module, 304 DC-AC conversion module, 305 AC charging control board, 306 DC charging control board, 3011 main control chip, 3012 voltage detection unit, 3013 automatic equalization unit, 3014 temperature detection unit, 3015 charge-discharge current detection unit.

DETAILED DESCRIPTION

Reference will now be made in detail to embodiments, examples of which are illustrated in the accompanying drawings.

Figure 1:
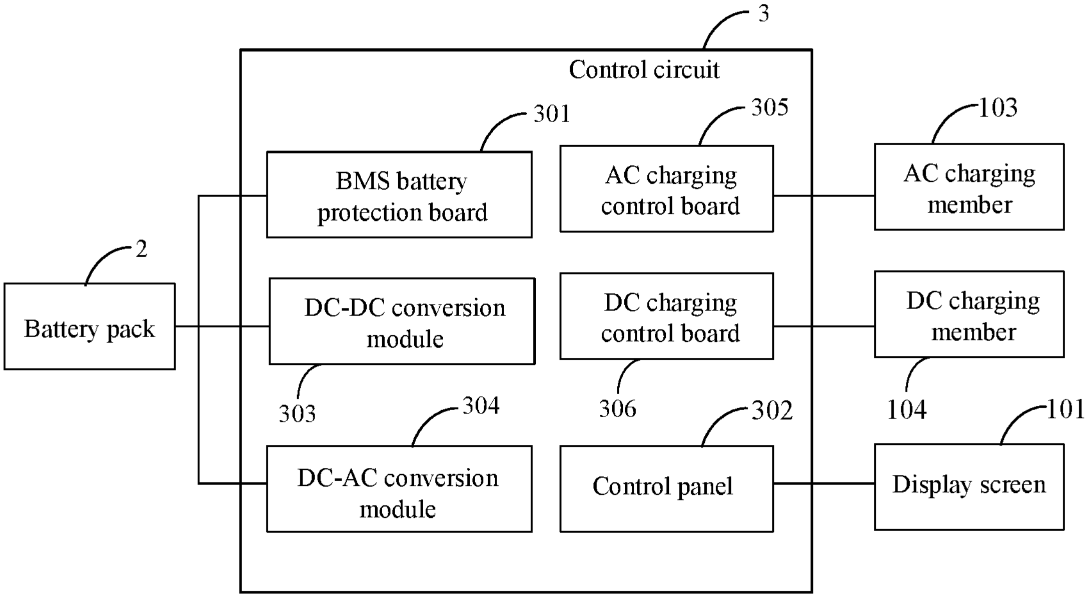
FIG. 1 is a schematic diagram of a circuit framework of a mobile power storage charging device in accordance with an embodiment of the present disclosure.
Figure 2:
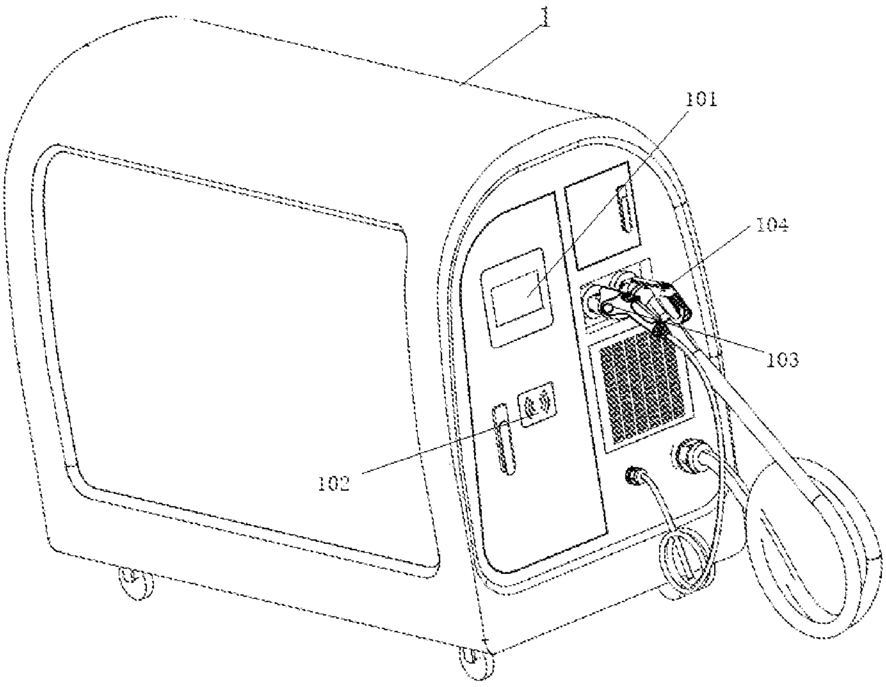
FIG. 2 is a schematic view of the mobile power storage charging device of the present disclosure.
Figure 3:
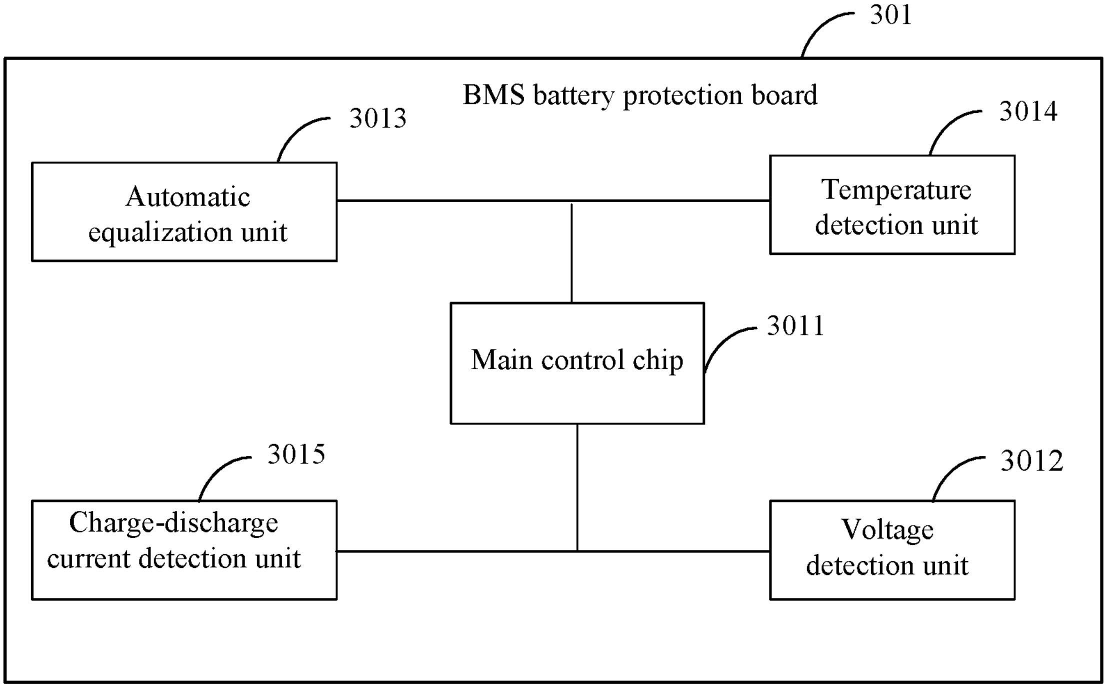
FIG. 3 is a schematic diagram of a circuit principle of a BMS battery protection board of the mobile energy storage charging device of the present disclosure.
Figure 4:
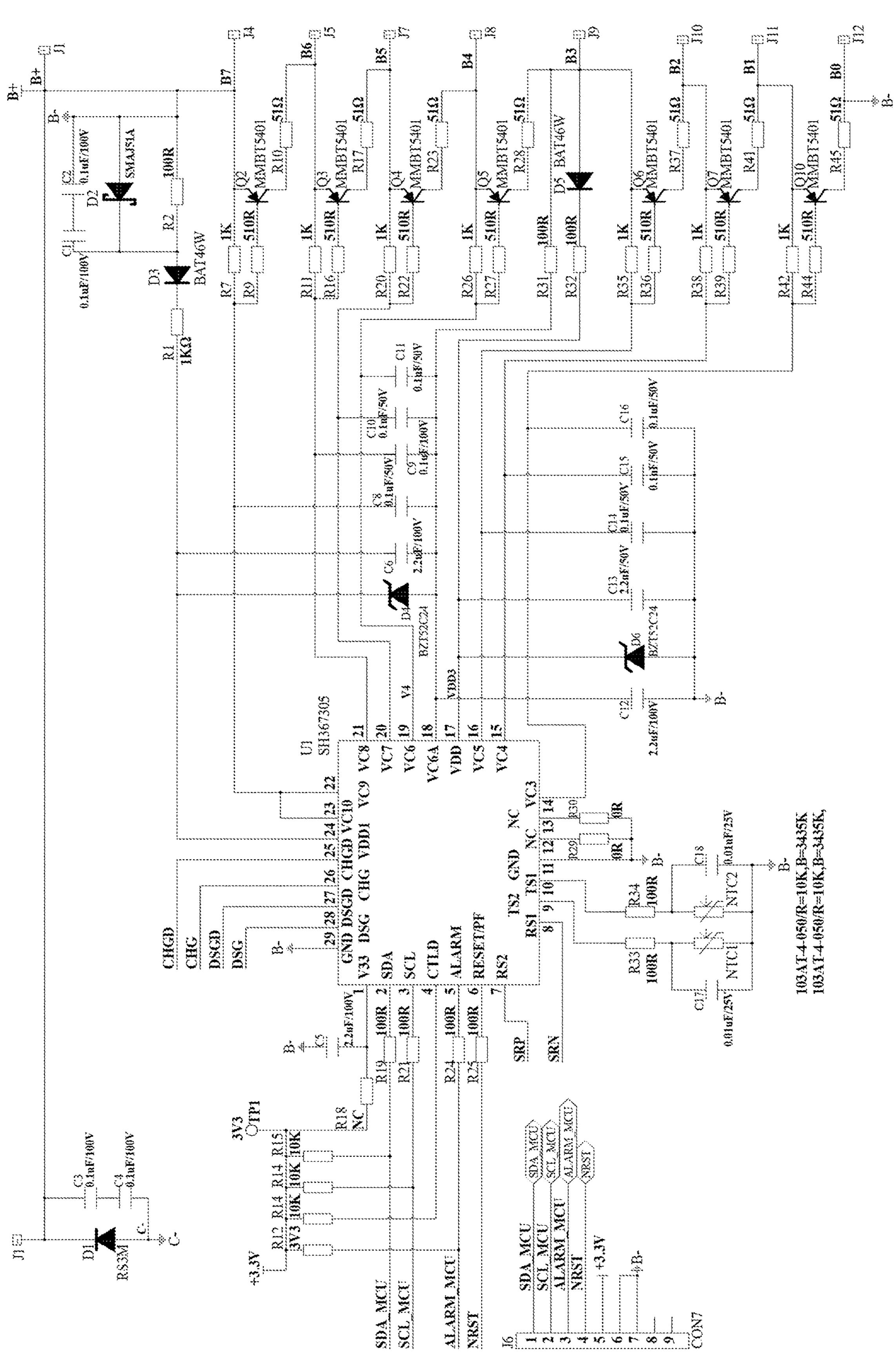
FIG. 4 is a circuit schematic diagram of the BMS battery protection board of the mobile energy storage charging device of the present disclosure.
Figure 5:
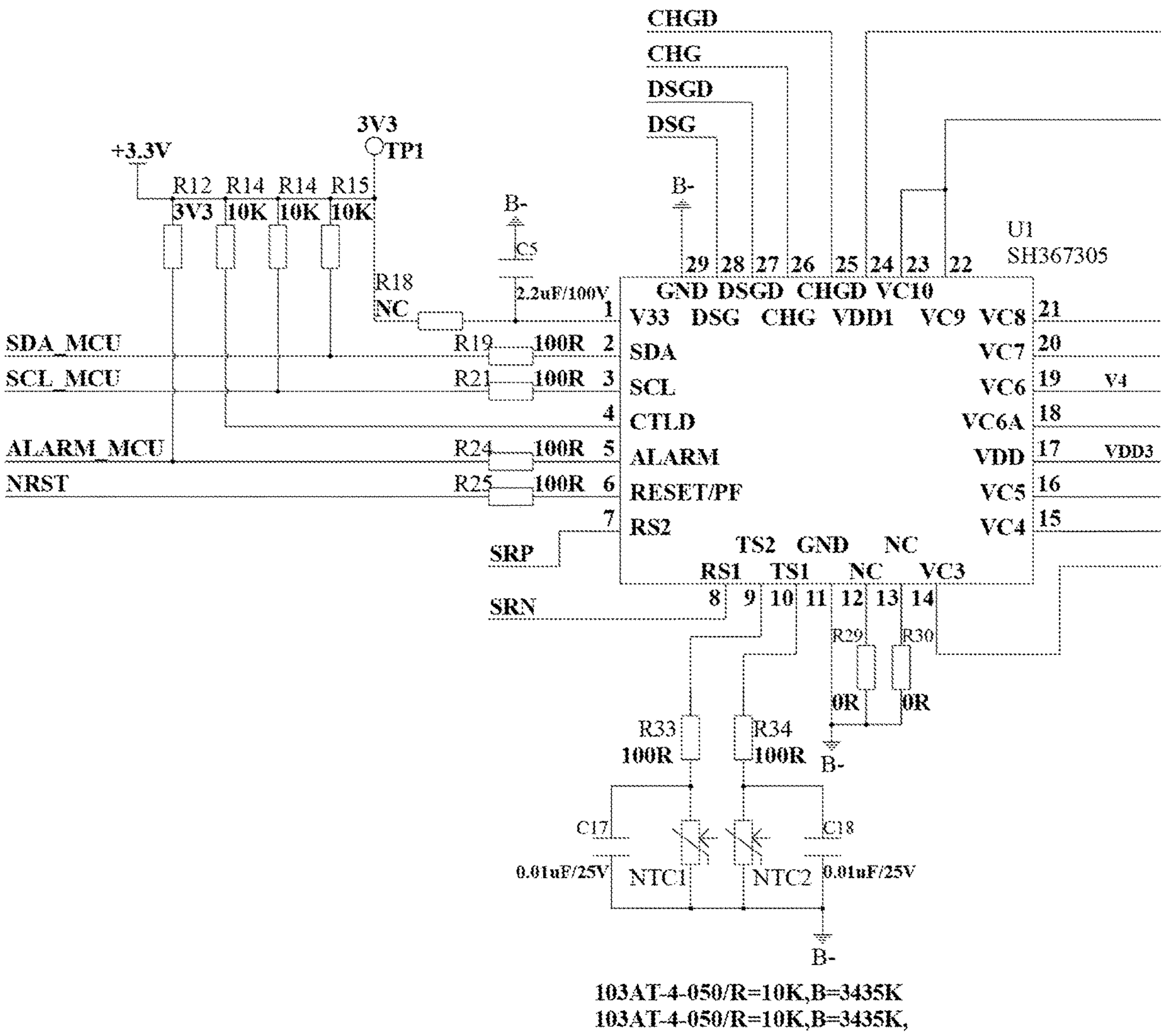
FIG. 5 is an enlarged schematic diagram of a local circuit of the BMS battery protection board of the mobile energy storage charging device of the present disclosure.
Figure 6:
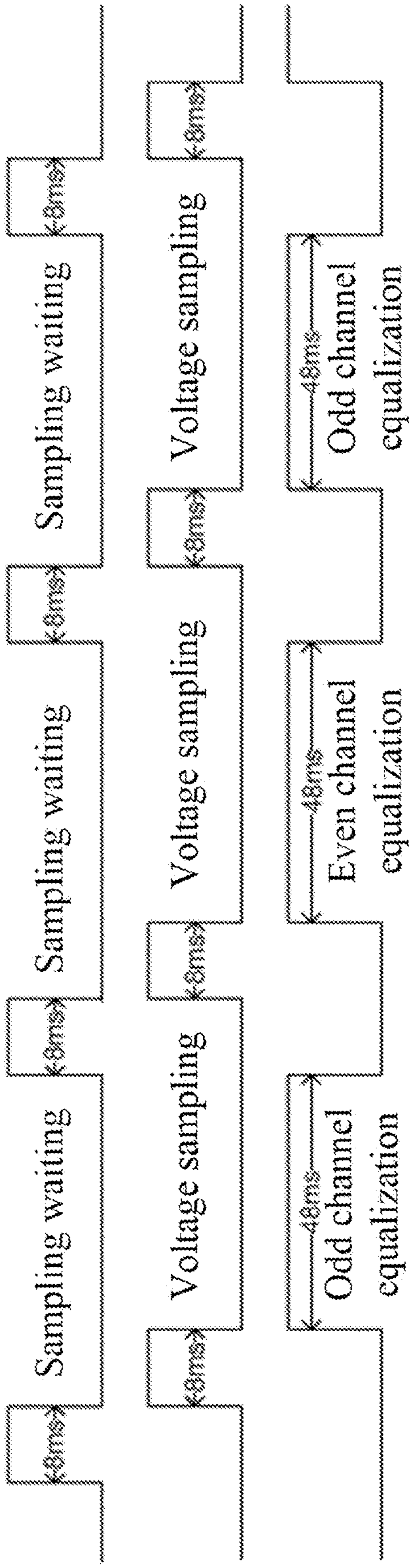
FIG. 6 is a schematic diagram of a voltage sampling and performing equalization timing sequence of an automatic equalization module of the BMS battery protection board of the mobile energy storage charging device of the present disclosure.

Referring to FIG. 1 to FIG. 6, a mobile power storage and charging device for a new energy vehicle in accordance with an embodiment of the present disclosure includes a housing 1, a battery pack 2 received in the housing 1, and a control circuit 3 electrically connected to the battery pack 2 and configured to obtain status data of the battery pack 2 for performing control adjustments on a battery of the battery pack. The control circuit 3 includes a BMS battery protection board 301, a control panel 302, a DC-DC conversion module 303, a DC-AC conversion module 304, an AC charging control board 305 and a DC charging control board 306; the BMS battery protection board 301, the DC-DC conversion module 303 and the DC-AC conversion module 304 respectively connected to the battery pack 2. The BMS battery protection board 301 is configured to detect a status of the battery pack 2 and perform control adjustments; the DC-DC conversion module 303 configured to convert voltages output from the battery pack 2 into a plurality of voltage values and then output to a DC port; the DC-AC conversion module 304 configured to convert direct current output from the battery pack into alternating current and then output to an AC port. The DC charging control board 306 is connected to the DC-DC conversion module 303, and the AC charging control board 306 is connected to the DC-AC conversion module 304.

In an embodiment of the present disclosure, the housing 1 includes a display screen 101 connected to the control panel 302, a card reader 102, an AC charging member 103 and a DC charging member 104; the card reader 102 configured to read card information and transmit the card information to the control circuit 3, both the AC charging member 103 and the DC charging member 104 connected to the new energy vehicle for applying power to the new energy vehicle.

The mobile power storage and charging device of the present disclosure is configured to electrically connect to the new energy vehicle through the AC charging member 103 or the DC charging member 104 to supply power to the new energy vehicle. The control circuit 3 of the above mobile power storage and charging device is configured to control each of the above modules. The BMS battery protection board 301 and a plurality of units integrated in the BMS battery protection board 301 are provided, so that a plurality of functions, such as detecting a voltage of a single battery of the battery pack 2, performing automatic equalization on the battery, detecting a temperature of the battery, detecting a charging current and a discharging current of the battery, and controlling shutdown of charging and discharging of the battery, is achieved, thereby ensuring safe charging and discharging of the battery and improving a safety performance of the mobile power storage and charging device. In addition, the DC-DC conversion module 303 can be configured to convert DC voltages of the battery to different voltage values and then output the different voltage values through a plurality of ports, so that the voltages that have been output can be selectively output. The DC-AC conversion module 304 can be configured to convert the DC voltage of the battery into an AC voltage to output the AC voltage, thereby enabling the battery to have a function of charging the AC current and enhancing practicality of the mobile power storage and charging device.

In an embodiment of the present disclosure, the DC-DC conversion module 303 includes a DC chip configured to obtain voltages from the battery pack 2 and then convert the voltages into other voltage values; and output ports of the DC-DC conversion module 303 include a USB interface and a Type-C interface.

In an embodiment of the present disclosure, the AC charging member 103 is controlled by the AC charging control board 305, and the DC charging member 104 is controlled by the DC charging control board 306.

In an embodiment of the present disclosure, the BMS battery protection board 301 includes a main control chip 3011, a voltage detection unit 3012, an automatic equalization unit 3013, a temperature detection unit 3014 and a charge-discharge current detection unit 3015; the main control chip 3011 connected to all the voltage detection unit 3012, the automatic equalization unit 3013, the temperature detection unit 3014 and the charge-discharge current detection unit 3015; and wherein the voltage detection unit 3012 is configured to detect a voltage value of each single battery within the battery pack 2 and adjust an abnormal state of the single battery during charging and discharging the single battery; the automatic equalization unit 3013 configured to obtain the voltage value of each single battery and balance the voltage; the temperature detection unit 3014 configured to obtain temperature data of the single battery and determine whether temperature protection is triggered based on the temperature data; the charge-discharge current detection unit 3015 configured to obtain a voltage drop of a current detection resistor in circuits during charging and discharging the single battery, to determine whether to perform over-current protection on the single battery.

In an embodiment of the present disclosure, the main control chip 3011 includes an MCU chip and a chip with a model of SH36705.

Specifically, the main control chip 3011 is the chip of SH367305, which is mainly configured to collect information of a voltage, a current and a temperature and then convert the information into digital signals. While, the MCU chip that can read the above information through a TWI communication. The chip of SH367305 does not burn to an upper computer because there is no EEPROM to be configured. Hardware protections of the main control chip 3011 of SH367305 only include a hardware over-charging protection and a short circuit protection, and relevant thresholds are configured by the MCU chip. Other overvoltage and undervoltage protection, charging and discharging over-current protection, and temperature protection rely on the MCU chip to collect sampling data, so as to turn off the charging MOS tube and the discharging MOS tube through sending instructions by software.

Specifically, the above mobile power storage and charging device has two working modes that are a working mode and a Power Down mode. The working mode can be configured to turn on/off various functional modules according to actual applications, so as to reduce power consumption thereof. The working mode can be simply divided into: a first working mode, a second working mode and a third working mode.

The first working mode is: turning on an LDO, all functional detection modules, and a VADC and a DCAC to enable continuous detection thereof.

The second working mode is: in order to reduce static system power consumption, some functional modules can be turned off to reduce the power consumption of the overall system, and the main control chip (MCU) can enter the Power Down state; at this time, only the charging MOS tube and the discharging MOS tube, an LDO (low voltage regulator) output, the DCAC, a hardware short-circuit protection function and a charge-discharge small current detection module need to be turned on.

When the system is in the second working mode, if an AFE detects a small charge-discharge current, an ALARM pulse can be generated to wake up the main control chip (MCU).

The third working mode is: in order to further reduce the static system power consumption, more functional modules can be turned off while the main control chip (MCU) enters the Power Down state; at this time, only the LDO output and the hardware short-circuit protection function need to be turned on.

When the system is in the third working mode, the main control chip (MCU) must be able to wake up by an external mode, and then re-enable the front-end functional modules to restore the system to work.

The Power Down mode is: the MCU can set registers to enable the AFE to enter the Power Down mode, only enabling a wake-up module and turning off the LDO output and all other functional modules. The AFE can be controlled to enter the working mode and the Power Down mode through the MCU (detecting changes in high and low levels of ON/OFF buttons).

In an embodiment of the present disclosure, the voltage detection unit 3012 includes a plurality of detection ports (B0-B7 ports as shown in the figures) connected to the single battery of the battery pack 2; and wherein when the battery pack 2 is in an over-charged state (such as 3.65V), the main control chip 3011 outputs a low level through a CHG (charging) port to control the charging MOS tube to be turned off; and when the battery pack 2 is in a discharge over-discharged state (such as 2.3V), the main control chip 3011 outputs a low level through a DSG (discharging) port to control the discharging MOS tube to be turned off.

In an embodiment of the present disclosure, the automatic equalization unit 3013 includes a sampling port, and is configured to obtain the voltage value of each single battery through the sampling port; and wherein when a voltage of any single battery is greater than an equalization detection voltage (such as 3.525V), and voltages of the rest of single batteries are less than the equalization detection voltage, and a delay time for performing equalization startup is exceeded, the main control chip 3011 opens an equalization channel.

In an embodiment of the present disclosure, the automatic equalization of the battery adopts parity channel time-sharing equalization (such equalization function does not affect a normal voltage sampling of the battery); when a plurality of equalization channels are opened simultaneously, odd channels first enter an equalization state, and even channels enter the equalization state in a next cycle; at this time, the voltage sampling of the battery and the equalization of the battery do not affect with each other.

In an embodiment of the present disclosure, the temperature detection unit 3014 is configured to obtain the voltage value through a TS port (TS1 and TS2 ports as shown in the figures) of the main control chip 3011; and when the voltage value reaches a pre-set internal comparison threshold and maintains a pre-set delay time, the temperature protection is triggered.

In an embodiment of the present disclosure, when the battery is under a condition of charging temperature protection, the main control chip 3011 controls the charging MOS tube to be turned off and the discharging MOS tube to be turned on; and when the battery is in a discharge protection state, the main control chip 3011 controls both the charging MOS tube and the discharging MOS tube to be turned off.

Specifically, a resistance value of an NTC resistor (i.e. a thermistor) varies along with temperatures. When the voltage detected by the TS port reaches the internal comparison threshold and a corresponding protection delay time is maintained, the temperature protection will be triggered. That is, when the charging temperature protection is performed, the charging MOS tube is turned off (CHG=0 V), and the discharging MOS tube is turned on (DSG=11 V); and when the discharging temperature protection is performed, the charging MOS tube is turned off (CHG=0 V), and the discharging MOS tube is turned off (DSG=0 V).

In an embodiment of the present disclosure, the charge-discharge current detection unit 3015 includes a charging over-current detection and a discharging over-current detection; and wherein when the voltage of the current detection resistor is less than a charging over-current detection threshold, a charging over-current detection delay time is maintained, and both the CHG port and the DSG port of the main control chip 3011 output a low level to control the charging MOS tube and the discharging MOS tube to be turned off, so that the charge-discharge current detection unit 3015 enters a charging over-current protection state; and when the voltage of the current detection resistor detected by a RS port (RS1 and RS2 ports as shown in the figures) of the main control chip 3011 is greater than a pre-set over-current protection threshold and remains above the over-current protection delay time, the DSG port of the main control chip 3011 outputs the low level to control the MOS tubes to be turned off, and the charge-discharge current detection unit 3015 enters a discharge over-current protection state.

Specifically, the charge-discharge current detection unit 3015 is built-in the charging over-current detection and the discharging over-current detection. The discharging over-current detection is a three-level over-current detection, including a first level over-current, a second level over-current, and a short-circuit protection. A protection mechanism of the charging over-current detection is: when the voltage of the current detection resistor of a main circuit is less than a charging over-current detection threshold (such as 20 mV), and the charging over-current detection delay time (0.5 S) is maintained, and both the CHG port and the DSG port output the low level to turn off the charging MOS tube and the discharging MOS tube (CHG=0V, DSG=0V), thereby entering the charging over-current protection state. A protection mechanism of the discharging over-current is to detect a voltage drop of the current detection resistor of the main circuit through the RS port to determine whether to enter a corresponding protection. Taking the first level over-current protection as an example, the discharge current changes along with an external load. Both the RS1 port and the RS2 port detect that the voltage of the current detection resistor is greater than a threshold set by the first level over-current protection (the threshold of the first level over-current protection is 50 mV, a threshold of the second level over-current protection is 100 mV, and a threshold of the short circuit protection threshold is 200 mV), and a time is maintained more than the delay time (is) of the first level over-current protection; and the DSG port outputs a low level to turn off the discharging MOS tube, so that the chip enters the over-current protection state.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Therefore, the present disclosure is not limited to specific embodiments described above, any variation or replacement made by one of ordinary skill in the related art without departing from the spirit of the present disclosure shall fall within the protection scope of the present disclosure. In addition, although specific terms are used in the specification, these terms are only for convenience of explanation embodiments described above, rather than intend to be any limitations to the present disclosure.

What is claimed is:

1. A mobile power storage and charging device for a new energy vehicle comprising:

a housing (1);

a battery pack (2) received in the housing (1); and a control circuit (3) electrically connected to the battery pack (2) and configured to obtain status data of the battery pack for performing control adjustments on a battery of the battery pack; and wherein the control circuit (3) comprises a BMS battery protection board (301), a control panel (302), a DC-DC conversion module (303), a DC-AC conversion module (304), an AC charging control board (305) and a DC charging control board (306); the BMS battery protection board (301), the DC-DC conversion module (303) and the DC-AC conversion module (304) respectively connected to the battery pack (2); the BMS battery protection board (301) configured to detect a status of the battery pack (2) and perform control adjustments thereof; the DC-DC conversion module (303) configured to convert voltages output from the battery pack (2) into a plurality of voltage values and then output to a DC (direct current) port; the DC-AC conversion module (304) configured to convert direct current output from the battery pack (2) into alternating current and then output to an AC (alternating current) port; the DC charging control board (306) connected to the DC-DC conversion module (303), and the AC charging control board (305) connected to the DC-AC conversion module (304); and wherein the BMS battery protection board (301) comprises a main control chip (3011), a voltage detection unit (3012), an automatic equalization unit (3013), a temperature detection unit (3014) and a charge-discharge current detection unit (3015); the main control chip (3011) connected to all the voltage detection unit (3012), the automatic equalization unit (3013), the temperature detection unit (3014) and the charge-discharge current detection unit (3015); and wherein the voltage detection unit (3012) is configured to detect a voltage value of each single battery within the battery pack (2) and adjust an abnormal state of the single battery during charging and discharging the single battery: the automatic equalization unit (3013) configured to obtain the voltage value of each single battery and balance the voltage; the temperature detection unit configured to obtain temperature data of the single battery and determine whether temperature protection is triggered based on the temperature data: the charge-discharge current detection unit (3015) configured to obtain a voltage drop of a current detection resistor in circuits during charging and discharging the single battery, to determine whether to perform over-current protection on the single battery; and wherein the main control chip (3011) comprises an MCU chip and a chip with a model of SH36705.

2. The mobile power storage and charging device as claimed in claim 1, wherein the housing (1) comprises a display screen (101), a card reader (102), an AC charging member (103) and a DC charging member (104); the card reader (102) configured to read card information and transmit the card information to the control circuit (3), both the AC charging member (103) and the DC charging member (104) connected to the new energy vehicle for applying power to the new energy vehicle.

3. The mobile power storage and charging device as claimed in claim 2, wherein the AC charging member (103) is controlled by the AC charging control board (305), and the DC charging member (104) is controlled by the DC charging control board (306).

4. The mobile power storage and charging device as claimed in claim 1, wherein the voltage detection unit (3012) comprises a plurality of detection ports connected to the single battery of the battery pack (2); and wherein when the battery pack is in an over-charged state, the main control chip controls a charging MOS tube to be turned off through a CHG (charging) port; and when the battery pack is in a discharge over-discharged state, the main control chip controls a discharging MOS tube to be turned off through a DSG (discharging) port.

5. The mobile power storage and charging device as claimed in claim 1, wherein the automatic equalization unit (3013) comprises a sampling port, and is configured to obtain the voltage value of each single battery through the sampling port; and wherein when a voltage of any single battery is greater than an equalization detection voltage, and voltages of the rest of single batteries are less than the equalization detection voltage, and a delay time for performing equalization startup is exceeded, the main control chip opens an equalization channel.

6. The mobile power storage and charging device as claimed in claim 1, wherein the temperature detection unit (3014) is configured to obtain the voltage value through a TS port of the main control chip; and when the voltage value reaches a pre-set internal comparison threshold and maintains a pre-set delay time, the temperature protection is triggered.

7. The mobile power storage and charging device as claimed in claim 6, wherein when the battery is under a condition of charging temperature protection, the main control chip controls a charging MOS tube to be turned off, and a discharging MOS tube to be turned on; and when the battery is in a discharge protection state, the main control chip controls both the charging MOS tube and the discharging MOS tube to be turned off.

8. The mobile power storage and charging device as claimed in claim 1, wherein the charge-discharge current detection unit (3015) comprises a charging over-current detection and a discharging over-current detection; and wherein when the voltage of the current detection resistor is less than a charging over-current detection threshold, a charging over-current detection delay time is maintained, and both the CHG port and the DSG port of the main control chip output a low level to control the charging MOS tube and discharging MOS tube to be turned off, so that the charge-discharge current detection unit enters a charging over-current protection state; and when the voltage of the current detection resistor detected by a RS port of the main control chip is greater than a pre-set over-current protection threshold and remains above the over-current protection delay time, the DSG port of the main control chip outputs the low level to control the MOS tube to be turned off, and the charge-discharge current detection unit enters a discharge over-current protection state.

* * * * *